United States Patent
Genty et al.

(10) Patent No.: US 10,803,312 B2
(45) Date of Patent: Oct. 13, 2020

(54) AI-POWERED AUTONOMOUS PLANT-GROWTH OPTIMIZATION SYSTEM THAT AUTOMATICALLY ADJUSTS INPUT VARIABLES TO YIELD DESIRED HARVEST TRAITS

(71) Applicant: AgEYE Technologies, Inc., Raleigh, NC (US)

(72) Inventors: Nicholas R. Genty, Wake Forest, NC (US); John M. J. Dominic, Cary, NC (US)

(73) Assignee: AgEYE Technologies, Inc., Raleigh, NC (US)

(*) Notice: Subject to any disclaimer, the term of this patent is extended or adjusted under 35 U.S.C. 154(b) by 19 days.

(21) Appl. No.: 16/433,330

(22) Filed: Jun. 6, 2019

(65) Prior Publication Data
US 2019/0377946 A1 Dec. 12, 2019

Related U.S. Application Data

(60) Provisional application No. 62/681,412, filed on Jun. 6, 2018.

(51) Int. Cl.
*G06K 9/00* (2006.01)
*G06T 7/00* (2017.01)
*G06N 3/04* (2006.01)

(52) U.S. Cl.
CPC ....... *G06K 9/00657* (2013.01); *G06N 3/0418* (2013.01); *G06T 7/0002* (2013.01); *G06K 2009/00644* (2013.01); *G06T 2207/30188* (2013.01)

(58) Field of Classification Search
CPC ............ G06N 3/0418; G06K 9/00657; G06K 2009/00644; G06T 2207/30188; G06T 7/0002
See application file for complete search history.

(56) References Cited

U.S. PATENT DOCUMENTS

| 2015/0347815 A1* | 12/2015 | Dante ................. G01J 3/28 382/191 |
| 2018/0024050 A1* | 1/2018 | Hollstein .......... G01N 33/0098 382/103 |

* cited by examiner

*Primary Examiner* — Edward Park
(74) *Attorney, Agent, or Firm* — NK Patent Law

(57) ABSTRACT

Inputs from sensors (e.g., image and environmental sensors) are used for real-time optimization of plant growth in indoor farms by adjusting the light provided to the plants and other environmental factors. The sensors use wireless connectivity to create an Internet of Things network. The optimization is determined using machine-learning analysis and image recognition of the plants being grown. Once a machine-learning model has been generated and/or trained in the cloud, the model is deployed to an edge device located at the indoor farm to overcome connectivity issues between the sensors and the cloud. Plants in an indoor farm are continuously monitored and the light energy intensity and spectral output are automatically adjusted to optimal levels at optimal times to create better crops. The methods and systems are self-regulating in that light controls the plant's growth, and the plant's growth in-turn controls the spectral output and intensity of the light.

20 Claims, 5 Drawing Sheets

AI-POWERED AUTONOMOUS PLANT-GROWTH OPTIMIZATION SYSTEM THAT AUTOMATICALLY ADJUSTS INPUT VARIABLES TO YIELD DESIRED HARVEST TRAITS

CROSS-REFERENCE TO RELATED APPLICATIONS

This application claims priority to U.S. Provisional Patent Application No. 62/681,412 filed on Jun. 6, 2018 with attorney docket number 917/2 PROV, entitled "AUTONOMOUS PLANT-GROWTH OPTIMIZATION SYSTEM THAT AUTOMATICALLY ADJUSTS THE LIGHT-ENERGY INTENSITY AND SPECTRAL OUTPUT TO OPTIMAL LEVELS," the entire contents of which is incorporated by reference herein.

TECHNICAL FIELD

The field of the invention relates generally to indoor farming. More particularly, the present invention relates to methods and systems incorporating artificial intelligence (AI) and Internet-of-Things (IoT) for monitoring and optimizing plant growth and quality in an indoor farm using optical sensors, imaging sensors, environmental sensors, and light sensors in real-time. Input from multiple sensors is used to determine characteristics about plants growing in an indoor farm and to automatically adjust the growing conditions, including light provided to the plants, to optimize the growth at each of the plants' growth phases to achieve the desired harvest traits.

BACKGROUND

As the agriculture and horticulture industries continue to evolve, indoor farming has gained popularity as a way to locally grow numerous types of plants, such as fruits, vegetables, and herbs. Indoor farming can be referred to by a number of other names, such as urban farming, vertical farming, and indoor horticulture. Indoor farming offers a number of advantages over traditional farming in that it is space-efficient (i.e., a high percentage of plants can be grown in a small space), it allows plants to be grown outside of their normal seasons and without concern for unpredictable weather issues (e.g., unexpected temperature and/or precipitation fluctuations), and it can produce more aesthetically pleasing plants.

Despite its advantages, indoor farming faces a number of challenges. For example, indoor farming can have high operational costs, and the systems required for indoor farming can be complex and expensive. In addition, unlike outdoor farms, the spread of plant pathogens and insect pests can occur very quickly in indoor farms because of their confined physical layout (e.g., the plants' close proximity to one another, both horizontally and vertically) and limited visual access for workers, making it difficult to frequently check for and detect infections and/or contamination in the plants.

Indoor farming relies on a man-made environment inside the building to grow the plants effectively. There are many variables that affect the growing environment, such as lighting, temperature, humidity, and air quality. These variables can be adjusted in an indoor farm to optimize their growth during their different growth phases. This allows growers to organically adjust the appearance, smell, and taste characteristics of plants.

Plants generally use light they receive in various ways. They use light to perform photosynthesis (e.g., photochemical quenching). Light that is not used for photosynthesis may be dissipated as heat (e.g., non-photochemical quenching) by the plant or may be re-emitted from the plant (referred to as chlorophyll fluorescence).

Different spectrums of light can have widely varying effects on plants. For example, some spectrums of light stimulate vegetative growth, while other spectrums of light increase the yield in flowers and fruits. Other spectrums of light, however, appear to have limited effect on plant growth, but might trigger responses in plants that are useful for defense, pollination, or aesthetics.

In addition, light intensity levels can have a significant effect on photosynthesis rates, which are directly related to a plant's ability to grow. However, the more light supplied to a plant, the less efficient the plant gradually becomes in processing that energy.

Not only does the spectral output and spectral intensity of light have an impact on plant growth, but the timing of the variance of spectrum and intensity with respect to a plant's growth stage can have a significant impact on a plant's physiology. One difficulty with determining when and how to apply individual variations of spectrum and intensity is that the measurements need to be done on a large scale, which makes measurement by hand subjective, inefficient, and difficult.

Therefore, there is a need to automate the indoor farming industry such that plants can be monitored in real time throughout their growth phases and the various environmental inputs for the plants (e.g., light, humidity, temperature, etc.) can be adjusted automatically to optimize the plants' growth and the indoor farm's output.

SUMMARY

To address the above problems, the present invention is generally directed to methods and systems incorporating artificial intelligence (AI) and the Internet-of-Things (IoT) for using one or more sensor inputs to analyze and optimize plant growth in real-time or near real-time by adjusting the light and other environmental factors provided to the plants. The methods and systems of the present invention continuously monitor plants in an indoor farm and automatically adjust the light energy intensity and spectral output to optimal levels at optimal times to create better crops. This is done on a per-plant basis, meaning that the methods and systems of the present invention provide plant-level precision, which provides optimized outcomes. The methods and systems are self-regulating in that light controls the plant's growth, and the plant's growth in-turn controls the spectral output and intensity of the light and other environmental variables. Additional benefits are recognized from having real-time or near real-time visibility of every plant at all times, which can effectively reduce the labor rate for an indoor farm.

The autonomous plant-growth optimization systems and methods uses computer vision combined with an artificial-intelligence decision model to identify plant phenotype and growth phase, collect and store the dataset in the cloud for analysis and deployment in edge devices for meaningful insights on the optimal growing conditions required and automatic adjustments of current growing conditions to achieve specific harvest traits. This continual cycle of monitoring and self-adjustment occurs for the entire growth cycle of the plants. This allows growers to increase profits and predictability through boosting plant quality and yield (e.g., odor/smell, taste, and appearance), changing harvest dates, increasing flower count, and enhancing color. It also allows growers to increase disease resistance of the plants and to reduce energy usage of lighting hardware in the indoor farm.

The features and advantages described in this summary and the following detailed description are not all-inclusive. Many additional features and advantages will be apparent to one of ordinary skill in the art in view of the drawings, specification, and claims presented herein.

DETAILED DESCRIPTION

Figure 1:
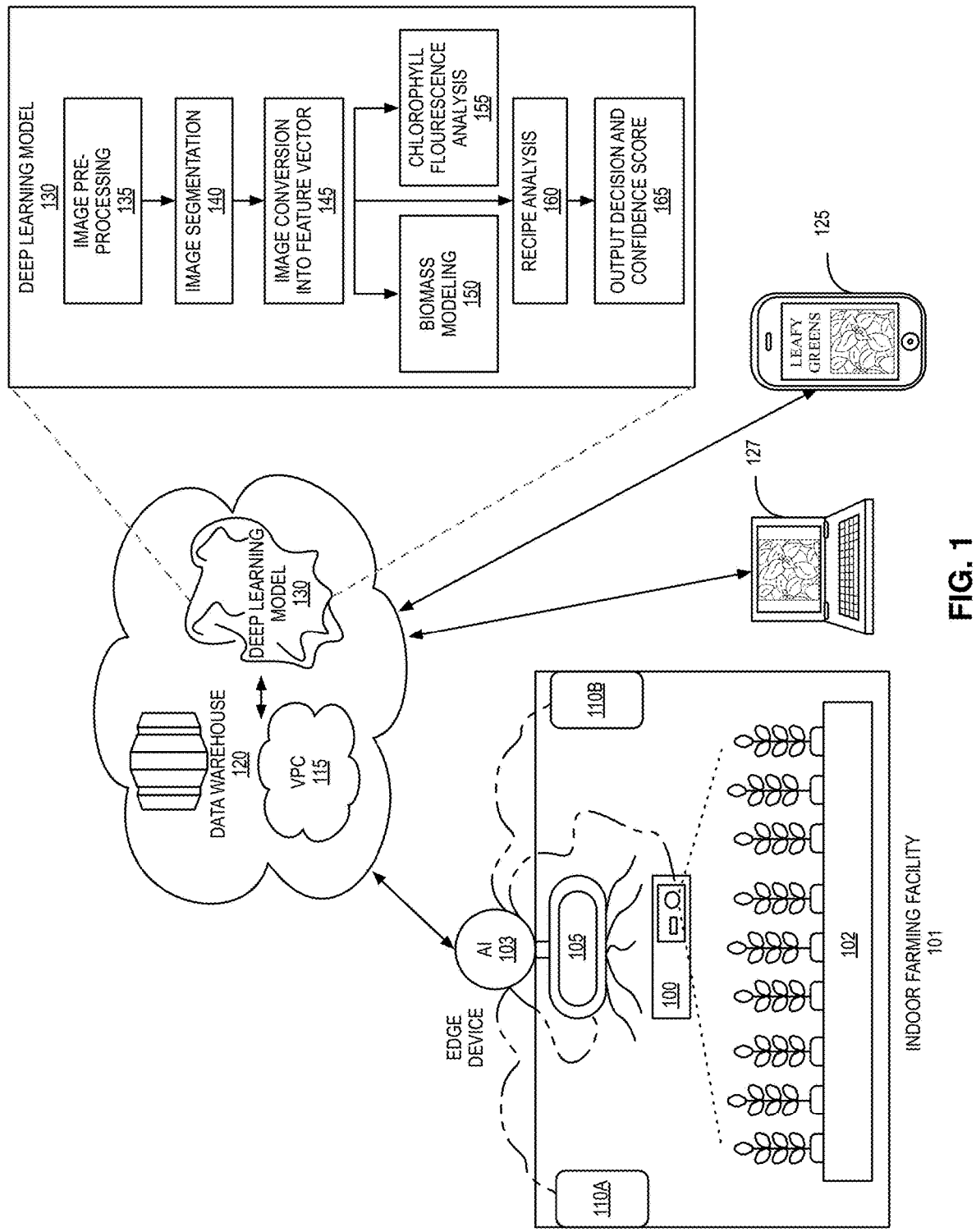
FIG. 1 shows a high-level architectural view of an exemplary embodiment of an autonomous plant-growth optimization system consistent with this disclosure.

The autonomous plant-growth optimization system described herein provides combination of artificial intelligence ("AI") technologies with the Internet of Things ("IoT") infrastructure to achieve more efficient IoT operations, improve human-machine interactions and enhance data management and analytics.

As will be described in greater detail below with reference to the figures, the subject matter described herein provides a self-regulating, interconnected system that includes intelligent lighting hardware, image-capture sensors, environmental sensors, an artificial-intelligence decision model, edge devices, and a user dashboard and/or mobile app for complete control of and visibility into the system. The subject matter further provides methods of operation for the system described herein. The systems and methods continuously monitor plants in an indoor farm using image data, automatically extract phenotypic features from the image data through automated, scalable, and reliable systems, store and train the collected data in the cloud for further analysis using machine-learning hosted in the cloud, make inference locally on one or more edge devices and controls, and/or regulate one or more input factors that plants use (e.g., light, air, water, and nutrients) such that the output of the indoor farms is optimized.

The systems and methods of the present invention determine an optimum light intensity for a plant. In some embodiments, the optimum light intensity is determined based on input from multiple sensors and applying that input against a machine-leaning model. In some embodiments, the optimum light intensity is determined based on measuring the chlorophyll fluorescence of one or more plants in the indoor farm to determine the photochemical efficiency of photosystem II in the plants (photosystem II is a system in plants that can be used to isolate health issues in the plant from the rest of the plant). The photochemical efficiency of each plant may be used to determine each plant's overall health and rate of photosynthesis. For example, the photochemical efficiency is analyzed, and that information is used to determine the minimum amount of light energy needed to maintain a high efficiency of the photosystem II (for example, a photochemical efficiency of 95%, measured as $Fv'/Fm'$ from a chlorophyll trace). A primary measurement used from a chlorophyll trace is that of the photochemical efficiency of photosystem II, which is a known fluorescence measurement. The photochemical efficiency of photosystem II can be used as a measure of the health of the photosystems. A high efficiency (for example, 0.986 or 98.6%) may indicate that everything inside photosystem II is working properly and precisely, whereas a low efficiency (for example, 0.687 or 68.7%) may indicate that the photosystems are likely stressed and/or damaged. Fv/Fm is calculated as variable fluorescence (Fv) divided by maximal fluorescence (Fm).

Once an optimum light intensity for the plant is determined, the intensity of the LED light is autonomously adjusted as necessary and when necessary to maintain the optimum light intensity. The adjustment to the light occurs in response to a lighting control signal that is generated using machine learning and/or artificial intelligence decision-making. The reduction of light energy from the LED fixtures significantly reduces the overall power consumption of indoor farms, while maintaining the ideal photosynthetic performance of the plants in the indoor farm.

In addition, the systems and methods of the present invention use computer vision (e.g., through image sensors) to identify potential contamination and/or infections in real-time, near real-time, or in advance through early detection. For example, computer vision is used to continuously scan one or more of the plants in the indoor farm using multiple image-capture sensors. The captured imagery is analyzed to detect problems with the plants, such as pathogens, diseases, and/or pests. Because of the types and sophistication of the sensors, these problems can be detected weeks earlier than they can be detected by the human eye. In addition, all plants can be monitored at the same time, which can be difficult, inconsistent, and time-consuming to do using human observation. This real-time visibility and advanced detection of plant issues greatly increases the profitability and operational efficiency of the indoor farm.

The systems and methods of the present invention use computer vision and deep-learning models to autonomously identify plant health, phenotype, and/or growth phase in order to modify environmental factors within the indoor farm to produce uniquely different harvest characteristics of plants. This way of improving the growing of crops through the use of intelligent, variable spectrum lighting hardware, sensors, and an artificial-intelligence engine improves the quality, predictability, and profitability of indoor horticulture. In addition, making dynamic adjustments to achieve an ideal intensity level of light at the various growth stages reduces the overall energy usage and costs associated with indoor farming operations.

FIG. 1 shows a high-level architectural view of an exemplary embodiment of an autonomous plant-growth optimization system consistent with this disclosure. The system uses multiple inputs and multiple outputs that may be configured based on the particulars of the indoor farm being operated, including the types of plants being grown in the indoor farm. For example, the system shown in FIG. 1 includes indoor farming facility 101. Indoor farming facility 101 includes one or more plants 102. Indoor farming facility 101 further includes one or more image sensors 100, one or more environmental sensors 110 (shown in FIG. 1 as 110a and 110b), and one or more light fixtures 105, which are located within the indoor farming facility 101. The number of plants 102, image sensors 100, light fixtures 105, and environmental sensors 110 may vary based on the specific farming facility.

The image sensors 100 in an autonomous plant-growth optimization system consistent with this disclosure are used to monitor one or more of the plants in the indoor farming facility 101. They generate image data that represents the plants being monitored and that can be used for processing (e.g., they take photographs and/or videos of the plants). The image sensors may include, for example, the following image inputs: (1) RGB imaging; (2) infrared (IR) imaging; (3) multi-spectral imaging; and (4) fluorescence imaging. One or more of these imaging systems may be used simultaneously. The various imaging sensors may be strategically placed throughout the facility to monitor the plants growing in the facility. For example, one of each type of the various imaging sensor may be used for each plant, or one imaging sensor may be used for more than one plant (e.g., all plants on a particular row, all plants in a particular quadrant, all plants of a particular age, all plants of a particular type, etc.).

The RGB imaging system may include standard digital color imaging, which may be used for classifying visual traits of the plants, such as plant type, plant count, plant area, plant density, growth uniformity, leaf count, leaf area, leaf density, number of flowers, number of ripened fruits and/or unripened fruits, etc.

The IR imaging system may include thermographic imaging, which may be used for measuring plant and/or leaf temperature to extract information on how the plant is using water. For example, thermographic imaging may include sensing transpiration and leaf stomatal conductance.

The multi-spectral imaging system may be used for measuring the reflectance spectra of plants within the visible and/or near-infrared range for measuring stress index of plants. The information extracted using the multi-spectral imaging may include level of plant pigments (e.g., chlorophyll, carotenoids, and/or anthocyanins), and water content.

The fluorescence imaging system may measure photosynthetic activity and/or the excitation of the green fluorescence protein. Chlorophyll fluorescence, as the light re-emitted by chlorophyll molecules during return from excited to non-excited states, is used as an indicator of photosynthetic energy conversion in higher plants, which may be used to determine environmental stresses that a plant may be experiencing (e.g., water deficit, temperature, nutrient deficiency, and/or infections by pathogens).

The one or more environmental sensors 110 in the autonomous plant-growth optimization system are used to monitor environmental factors in the indoor farming facility 101. Multiple sensors may be strategically placed throughout the facility to provide comprehensive data relating to various environmental factors. The environmental sensors may include, for example, carbon dioxide ($CO_2$) sensors, moisture or humidity sensors, temperature sensors, pH sensors, electrical conductivity ("EC") sensors, energy usage sensors, photosynthetic active radiation (PAR) sensors, DLI sensors, photosynthetic photon flux (PPF) sensors, photosynthetic photon flux density (PPFD) sensors, and other sensors used for detecting or sensing characteristics of the environment inside the indoor farm (e.g., air quality sensors, carbon monoxide (CO) sensors).

The $CO_2$ sensors may be used to continuously collect the carbon dioxide levels at the facility. The moisture or humidity sensors may be used to continuously collect relative humidity levels of the facility. The temperature sensors may be used to continuously collect the temperature of the facility. The pH sensors may be used to continuously monitor the pH levels of the growing medium of the facility. The EC sensors may be used to continuously monitor the electrical conductivity levels of the growing medium to the facility. The energy usage sensors may be used to continuously collect the energy being used by the lighting equipment in the system. The PAR sensors may be used to continuously measure the photosynthetic active radiation generated by the lighting equipment in the system. The DLI sensors may be used to measure the total amount of lighting reaching or delivered to a plant over a particular period of time (e.g., every 24 hours). The PPF sensors may be used to measure the photosynthetic photon flux from the lighting equipment in the system. The PPF from the lighting equipment provides a representation of the amount of light emitted from the lighting equipment, generally represented as the lamps' total emitted number of photons per second in the PAR region (measured in µmol/s). The PPFD sensor may be used to continuously measure the photosynthetic photon flux density. The PPFD is a field measurement that measures the number of photons in the PAR region emitted per square meter per second (measure in $\mu mol/m^2/s$). The PPFD provides a representation of the light reaching the surface of the plant(s) in the indoor farm.

The various environmental sensors may be strategically placed throughout the facility to monitor the plants growing in the facility. For example, one of each type of the various environmental sensors may be used for each plant, or one type of environmental sensor may be used for more than one plant (e.g., all plants on a particular row, all plants in a particular quadrant, all plants of a particular age, all plants of a particular type, etc.).

The one or more light fixtures 105 in the autonomous plant-growth optimization system are used to provide various types of light and/or variable light spectrum to the plants in the indoor farming facility 101. These light fixtures 105 may include various types of light sources, including but not limited to LED light sources, IR light sources, fluorescent light sources, and halogen light sources. The light sources may provide the complete spectrum of light, including all colors of the rainbow, to approximate sunlight. The light sources may include warm light sources as well as cool light sources. The light fixtures 105 receive one or more lighting control signals that cause the light fixtures to adjust their light output in response to the lighting control signals. The lighting control signals are generated autonomously based on a machine-learning model.

The image sensors 100, the light fixtures 105, and the environmental sensors 110 include network connectivity functionality. In some embodiments, they include wireless connectivity, such as WiFi and/or cellular connectivity. In other embodiments, they include wired connectivity, such as Ethernet or USB connectivity. In this way, image sensors 100, the light fixtures 105, and the environmental sensors 110 are Internet of Things (IoT) devices and make up an IoT network.

The autonomous plant-growth optimization system further includes a data warehouse 120. The data warehouse 120 stores and processes incoming data from the sensors in the indoor farming facility 101. The data warehouse 120 may comprise a virtual private cloud 115, which appears as a cloud computing resource that is devoted to the data gathered from and processed for the indoor farming facility 101. In one embodiment, the data warehouse 120 is a cloud server, such as an Amazon Web Services ("AWS") cloud server. The data warehouse 120 includes one or more processors and one or more memory devices for storing and processing information and computer instructions. The image sensors 100, the light fixtures 105, and the environmental sensors 110 are configured to communicate with the data warehouse 120 and/or the virtual private cloud 115 using their IoT connectivity (e.g., either wirelessly or through a wired connection). In one embodiment, they communicate with the data warehouse 120/virtual private cloud 115 directly. In another embodiment, they communicate with the data warehouse 120/virtual private cloud 115 through an intermediate device referred to as an edge device 103, which connects wirelessly or through a wired connection (e.g., the edge device 103 operates as a gateway or hub for the devices in the indoor farming facility 101). FIG. 1 shows edge device 103.

The data warehouse 120 uses artificial-intelligence decision-making and/or machine-learning hosted at the data warehouse 120 to autonomously make and/or optimize growing decisions. In one embodiment, an artificial-intelligence decision-making model and/or machine-learning model may be first created or defined and then may be deployed to the data warehouse 120 where it can be trained and/or used for decision-making. The system further includes one or more user interfaces and/or control systems, which may be accessed using a computer 127 or a mobile device 125.

The autonomous plant-growth optimization system may be configured to receive one or more user inputs via the user interface or control system. The one or more user inputs may include information relating to the desired harvest traits and/or yield characteristics that the grower is trying to achieve. This information relating to the desired harvest traits and/or yield characteristics may be referred to as a "spectral recipe." For example, a user may log in to the system via mobile device 125 or computer 127 and configure one or more settings to create various spectral recipes for the different types of plants being grown. The spectral recipe may specify the specific types, intensities, and/or spectra of light to be output during each growth phase.

The autonomous plant-growth optimization system may be configured to generate numerous outputs, which are used by the system (e.g., in a feedback loop) to adjust relevant aspects of the indoor farming facility to optimize plant growth. The various data outputs generated by the autonomous plant-growth optimization system may include plant phenotype, plant maturity, plant growth phase, plant health, recommended spectral output for achieving harvest goal, and various trends of information in the system over time.

The plant phenotype output may include plant phenotype information for each of one or more plants in the indoor farm. The plant phenotype information may include a plant type, plant area, plant density, growth uniformity, biomass, leaf shape, leaf density, leaf count, leaf color (greenness/yellowness), and other information about the characteristics of the plant. The plant phenotype information may be derived from one or more of the imaging sensors or other sensors in the system using, for example, computer vision and/or computer-based image analysis.

The plant maturity or plant growth phase output may include information for each of one or more plants in the indoor farm. The plant maturity or plant growth phase information relates to the age of the plant or what growth phase the plant is in at any particular time.

The plant health output may include information for each of one or more plants in the indoor farm. The plant health information relates to, for example: (1) any visible infections, deformities, and/or abnormalities identified as part of the computer-based image analysis; (2) plant and leaf temperature, which indicates plant water behavior, including transpiration and leaf stomatal conductance, measured by environmental sensors including temperature sensors and moisture sensors; (3) chlorophyll fluorescence to determine changes in the photosynthetic efficiency of plants; and (4) spectral reflectance to assess any environmental stresses on plants experiencing adverse conditions, such as water deficit, temperature, nutrient deficiency, and infections by pathogens.

The recommended spectral output for achieving harvest goal may include information relating to what type of light quality, quantity and duration should be applied to one or more plants in the indoor farm in order to optimize the plant's growth and/or achieve a harvest goal in the system. The harvest goal may be input by a user or determined by the autonomous plant-growth optimization system based on the inputs to the system and information determined using computer vision and machine learning.

The trends of information identified or measured in the system may include trends of PPFD, DLI, and/or PAR levels over the growth period of one or more plants in the system, as well as how those levels compare to historical data and/or target data. The trends of information in the system may further include energy usage charted over the growth period of one or more plants in the system, as well as how that energy usage compares to historical and/or target data.

The autonomous plant-growth optimization system further includes an artificial-intelligence decision model to autonomously make and/or optimize growing decisions. The artificial-intelligence decision model processes inputs from one or more of image sensors, environmental sensors, and user data to predict the correct spectrum and intensity of light needed to achieve desired harvest characteristics and/or yield of one or more plants in the indoor farm.

The artificial-intelligence decision model may use machine learning and/or deep learning dedicated to horticulture and plant phenotyping to analyze images of the plants from the indoor farm. Using the artificial-intelligence decision model, the plants are characterized using image processing. The collected image data may be stored in cloud (e.g., data warehouse 120) for further analysis. The artificial-intelligence decision model is deployed in the cloud (e.g., data warehouse 120) so that it can be run on the image data and/or other data stored in the cloud. One or more edge devices 103 may be used for making inferences and valuable insights locally. The trained artificial-intelligence decision model may be deployed from the cloud to edge device 103 for making the inferences and insights locally. Using computer vision combined with machine-learning and/or deep-learning algorithms, the artificial-intelligence decision model can perform multiple tasks, including, for example: (1) plant detection and localization (multi-instance detection/localization); (2) plant segmentation (foreground to background segmentation); (3) leaf detection, localization, and counting (multi-instance detection, object counting); (4) leaf segmentation (multi-instance segmentation); (5) leaf tracking (multi-instance segmentation); (6) boundary estimation for multi-instance segmentation (boundary detectors); (7) classification and regression of mutants and treatments (general classification recognition); and (8) growth phase and maturity prediction. Each of these tasks may be performed using deep-learning model 130 shown in FIG. 1, using the exemplary architecture shown in FIG. 2.

Plant detection and localization refers to detecting a plant by its location in the context of multiple plants contained within a single captured image. For example, if a given image contains ten plants, plant detection and localization allows the system to focus on a single plant within the image. Plant detection and localization may be performed using the steps of deep-learning model 130 shown in FIG. 1, with each step of deep-learning model 130 being performed using the exemplary architecture shown in FIG. 2.

Plant segmentation refers to identifying individual plant boundaries in an image containing multiple plants, even in cases of overlapping plant structures. It allows the system to understand where one plant begins and ends. Plant segmentation may be performed using the steps of deep-learning model 130 shown in FIG. 1, with each step of deep-learning model 130 being performed using the exemplary architecture shown in FIG. 2.

Leaf detection, localization, and counting refers to identifying a leaf's position and leaf count in any given plant, including where the leaf is located in the context of the plant (e.g., in the top ⅔ of the plant). Leaf detection, localization, and counting may be performed using the steps of deep-learning model 130 shown in FIG. 1, with each step of deep-learning model 130 being performed using the exemplary architecture shown in FIG. 2.

Leaf segmentation refers to detecting boundaries for any given leaf. Leaf segmentation may be performed using the steps of deep-learning model 130 shown in FIG. 1, with each step of deep-learning model 130 being performed using the exemplary architecture shown in FIG. 2.

Leaf tracking refers to tracking changes in a leaf over a particular period of time. This may include tracking changes in the leaf's size, shape, and/or color of the leaf over time, as the leaf grows. Leaf tracking may be performed using the steps of deep-learning model 130 shown in FIG. 1, with each step of deep-learning model 130 being performed using the exemplary architecture shown in FIG. 2.

Boundary estimation for multi-instance segmentation refers to identifying where sections of a group of similar plants begin and end (as opposed to where a single plant begins and ends). Boundary estimation for multi-instance segmentation may be performed using the steps of the deep-learning model shown in FIG. 1, with each step of the deep-learning model being performed using the exemplary architecture shown in FIG. 2.

Classification and regression of mutants and treatments refers to identification and classification of changes and/or abnormalities in the genetic structure of a plant. The resulting data may be used to provide necessary plant treatment recommendations. Classification and regression of mutants and treatments may be performed using the steps of the deep-learning model shown in FIG. 1, with each step of the deep-learning model being performed using the exemplary architecture shown in FIG. 2.

Growth phase and maturity prediction refers to identifying different growth phases of a plant and detecting the maturity level of a plant within each growth phase. Growth phase and maturity prediction may be performed using the steps of the deep-learning model shown in FIG. 1, with each step of the deep-learning model being performed using the exemplary architecture shown in FIG. 2.

Figure 3:
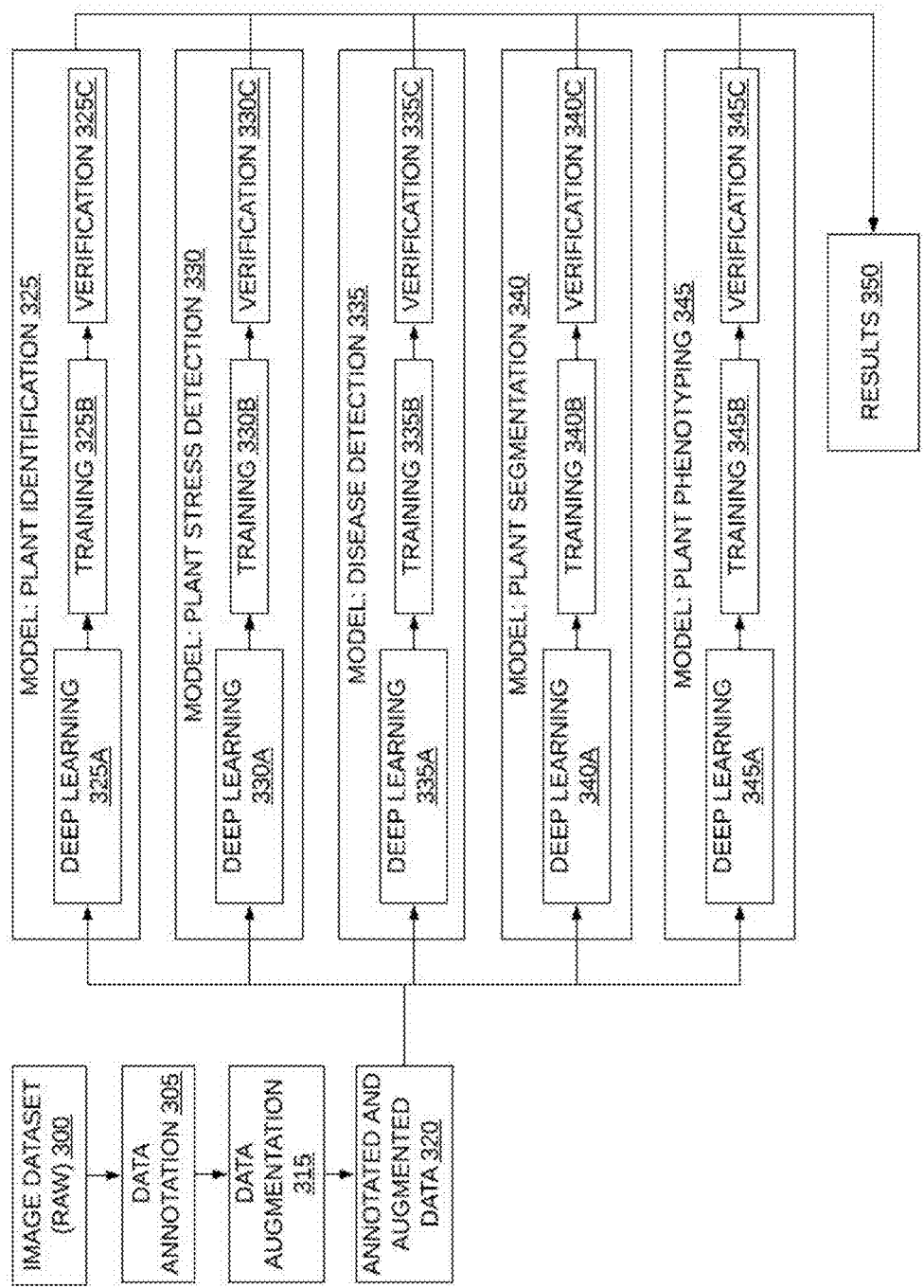
FIG. 3 shows an exemplary training model for each instance of the processing tasks performed using the exemplary architecture of FIG. 2.

As explained in more detail with respect to FIG. 3, the artificial-intelligence decision model may be trained using supervised training or unsupervised training (e.g., by using feedback in the machine-learning context or by using individual traits and building blocks in the deep-learning context) to perform the above tasks more efficiently and accurately. As one example of training, for each the above tasks, a user may feed raw images of plants to the artificial-intelligence decision model to be analyzed, and then provide feedback to the decision model based on how accurately the platform performed each of these tasks. Based on the user-provided feedback, the artificial-intelligence decision model can further update its algorithms to perform the tasks more accurately. As one example, the artificial-intelligence decision model may analyze raw images of plants and output the number of plants it detects in those raw images and the number of leaves on each of those plants. A user may then provide the artificial-intelligence decision model with the correct number of plants and leaves on each plant. The artificial-intelligence decision model can take the correct number into account to adjust its algorithms such that it more accurately counts plants and leaves the next time it performs those tasks.

As shown in FIG. 1, an exemplary embodiment of an autonomous plant-growth optimization system may further include an edge device 103. Edge device 103 is optional and may be used in some embodiments but not used in other embodiments. Edge device 103 is a processing device that is physically located at the indoor farming facility 101 and that has connectivity to the data warehouse 120 as well as all of the sensors and the lighting fixtures in the farming facility. In one embodiment, edge device 103 is a microcontroller. The microcontroller may be a direct-drive controller that uses the If This Then That ("IFTTT") framework for controlling the devices in the indoor farming facility 101. In other embodiments, edge device 103 may be a personal computer or a server known in the art. Edge device 103 includes at least one processor that can be used for implementing localized decision-making and/or localized inferences based on decision models and/or intelligence received from the data warehouse 120 using either data that is received from the sensors or data that is stored in the data warehouse 120, or both. As the data warehouse 120 builds and/or refines data models using training for machine-learning, the trained models are pushed from data warehouse 120 to edge device 103 over a network connection so that edge device 103 can handle processing at the edge of the indoor farming facility 101, which is more local than attempting to communicate with the data warehouse 120 (e.g., the cloud server). The models may be pushed to edge device 103 as over-the-air ("OTA") updates.

As explained above, the various sensors and light fixtures in the indoor farming facility described above have connectivity via WiFi and/or cellular signal, which allows them to communicate to the data warehouse/cloud server, where the machine-learning training and then resulting processing is performed. Often, an indoor farming facility may be physically located in remote locations where wireless and/or wired connectivity is either not reliable, or not fast, or both. In a system without an edge device as described herein, in some cases, unacceptable or undesirable latency occurs because of poor connectivity. Additionally, because the cloud-based processing is heavily image-based, the transmissions require a lot of bandwidth, which can be problematic even when there is good connectivity (which, as noted above, there often is not).

By using an edge device with localized intelligence, the growing decisions may be made locally without the need to communicate with the cloud (e.g., make resource-intensive server calls). In other words, the edge devices allow for processing at the local level without having to have processing at each individual sensor.

The autonomous plant-growth optimization system may further include one or more user interfaces and/or control systems, which may be accessed using a computer or a mobile device. For example, the autonomous plant-growth optimization system may be accessible through an interface on a mobile app on a mobile device (e.g., cell phone, tablet, etc.) or a web interface on a computer (e.g., access through a web browser). The interface may provide a user with access to real-time information from each sensor in the system, such that the user can monitor any information within the system (e.g., images of the plants, readings from the environmental sensors, etc.). The interface may provide the user with information in the system, such as the number and type of each plant in the system and the current growth phase of each plant in the system. The interface may provide the user with information relating to outputs of the system, such as the current output settings of the various lights in the system. The interface may further provide the user with the ability to adjust the outputs of the system, such that the user can override the autonomous nature of the system to adjust the light output, temperature in the indoor farm, humidity in the indoor farm, etc. The interface may further provide trend data to the user, such that the user can view historical trends over time relating to the inputs and outputs in the system. The interface may further provide the user with the ability to train the artificial-intelligence decision model, as discussed above and also in the context of FIG. 3. Because the user interface of the system can be accessed through a mobile device or a computer, it can be accessed from anywhere, allowing the user to monitor and/or adjust the system without having to be physically present at the indoor farm.

The autonomous plant-growth optimization system described herein further provides intelligent inventory management functionality. The intelligent inventory management functionality allows for the system to provide accurate, up-to-date inventory information in real-time (or nearly real time). For example, the autonomous plant-growth system described herein measures canopy density and real-time plant inventory using the image sensors and computer vision. In addition, the system predicts the average fresh biomass yield per square foot, and it maintains up-to-date predictions that take into account actual yield that has already occurred as well as future yield from currently growing plants as well as projected future yield from plants that are not yet growing but that can be determined using historical trends and real-time sensor data (e.g., factoring in possibility of disease). The system provides information including average growth rate and probable harvest date for plants being grown, which allows other entities within the supply chain to plan accordingly, leading to more efficient supply chains. The system additionally provides uniformity in the growth of plants, which makes plants easier to transplant as well as package, leading to additional efficiencies.

The autonomous plant-growth optimization system described herein further provides smart scouting functionality. The smart scouting functionality allows for the system to automatically detect plant stress and/or plant disease much earlier than can be seen with the naked eye. This early prediction and/or detection of problems leads to time savings in the growth cycle and reduces labor costs. In one embodiment, the early prediction of disease is based on leaf wetness (i.e., presence of free water on the surface of the crop canopy), which may be measured by the moisture or humidity sensors or may be determined using computer vision. For example, the time duration of leaf wetness may be used to determine the probability of onset of diseases. This information, when coupled with temperature information measured by the temperature sensors, may further be used to determine the severity of disease in the plant. As an example, an infection of downy mildew in basil may be considered severe when the leaf wetness duration is between 6-12 hours after inoculation (e.g., presence of pathogen) at a temperature of approximately 68 degrees Fahrenheit. The system analyzes the probability of competition among plants and/or the probability of the development of a microclimate. Microclimate refers to the set of ambient environmental conditions immediately surrounding the crop, which may differ slightly from the environment above the crop, particularly in terms of temperature, humidity, incident light radiation, and air flow. The ambient environmental conditions immediately surrounding the crop may be measured using the various environmental sensors described herein. The more closely plants are spaced to one another and/or the denser the crop canopy is, the greater the chances of a crop microclimate developing with larger difference values than the above environment. The development of such a microclimate may be favorable for a number of plant pathogens and insect pests to flourish in and/or around the crop canopy and cause contamination if the conditions remain for an extended period. The system analyzes ambient environmental data (e.g., leaf wetness, temperature, and humidity) over time to determine the probability of a disease outbreak. The system uses computer vision to detect early stress symptoms, which allows the system to detect plant stress earlier than would otherwise be possible.

Figure 2:
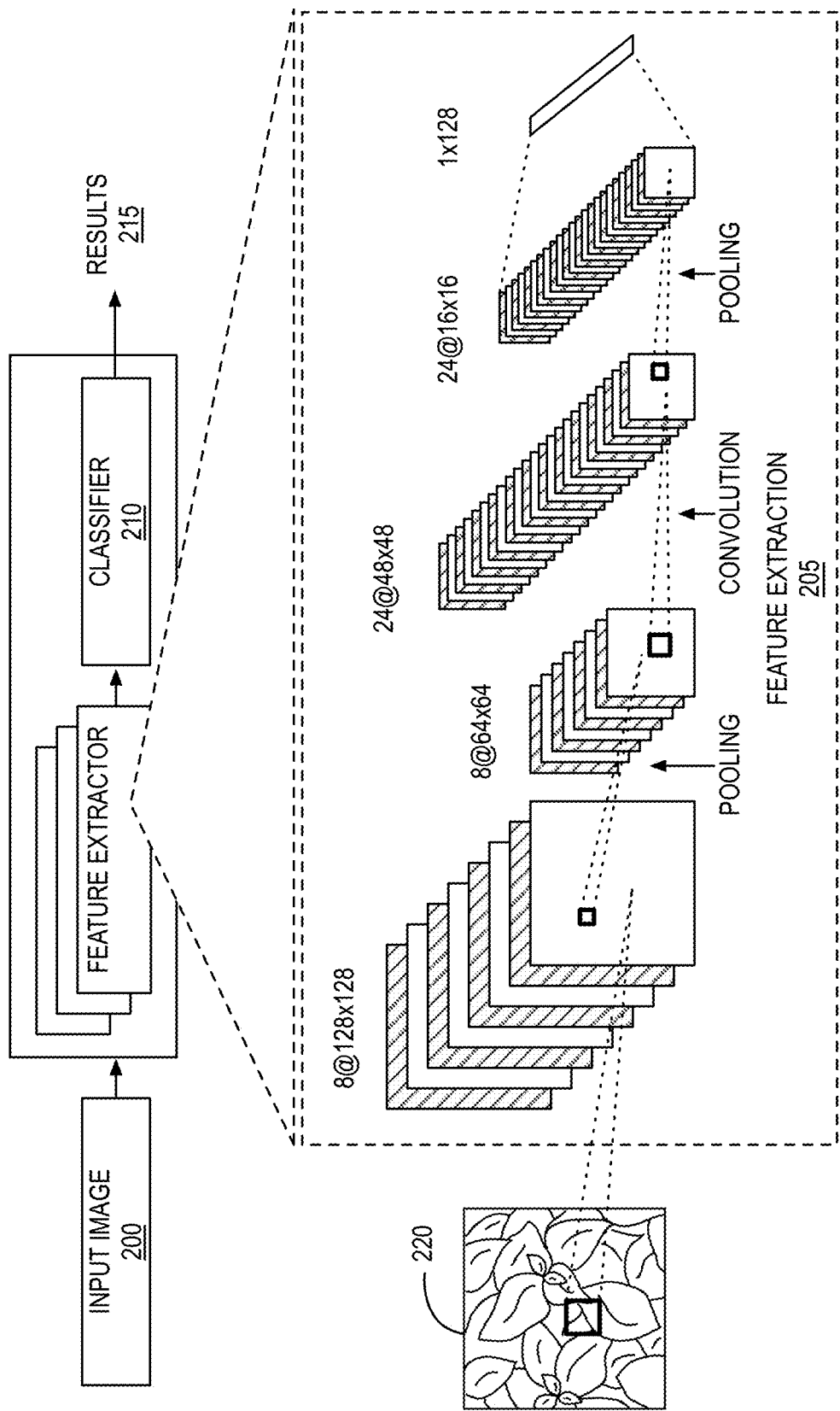
FIG. 2 shows an exemplary architecture of a convolutional neural network (CNN) of the autonomous plant-growth optimization system that may be used to perform the processing described herein.

FIG. 2 shows an exemplary architecture of a convolutional neural network (CNN) of the autonomous plant-growth optimization system that may be used to perform the processing described herein. Some of the processing steps are shown in deep-learning model 130 in FIG. 1. As shown in FIG. 1, the autonomous plant-growth optimization system may perform one or more of the following processing tasks as part of its image analysis and processing to detect plant phenomics and growth phase: (1) image pre-processing 135; (2) image segmentation 140; (3) image conversion into k-dimensional feature vector 145; (4) plant biomass modeling 150; (5) plant health modeling (e.g., chlorophyll fluorescence analysis) 155; (6) recipe analysis 160; and (7) output decision and confidence score 165. Depending on the image input, one or more processing, segmentation, and or feature vectors may be used at a time. Each of these processing tasks may use the exemplary architecture shown in FIG. 2 to perform the task.

As shown in the example of FIG. 2, for each processing task performed, the artificial-intelligence engine may take one or more images as input and perform feature extraction and classification to produce results as output. Input image 200 is fed to feature extractor 205 and then to classifier 210. The classifier 210 shown in FIG. 2 may be, for example, any of the image-analysis tasks described in the context of FIG. 1 (e.g., plant detection and localization, plant segmentation, leaf detection and localization, leaf counting, leaf segmentation, etc.). Classifier 210 classifies what information is being determined at a particular processing phase.

Image pre-processing 135 (shown in deep learning model 130 of FIG. 1) may be performed to prepare an image for further processing. Image pre-processing 135 may be performed using one or more of the following techniques, alone or in combination: (1) image cropping; (2) contrast adjustment; (3) dimensionality reduction; (4) edge detection; and (5) equalization.

Image segmentation 140 (shown in deep learning model 130 of FIG. 1) may be used to partition an image into a set of regions Image segmentation 140 may be performed using one or more of the following image-analysis techniques, alone or in combination: (1) thresholding grayscale segmentation; (2) Otsu's Method for clustering-based image thresholding; (3) watershed segmentation; (4) GrabCut segmentation; (5) active contour modeling (e.g., using snakes for object tracking, shape recognition, segmentation, edge detection, and/or stereo matching); (6) scikit-image processing algorithms for geometric transformations, color space manipulation, analysis, filtering, morphology, and feature detection; (7) COCO for large-scale object detection, segmentation, and contextual understanding; and (8) OpenCV for 3D visualizations.

Image conversion 145 (shown in deep-learning model 130 of FIG. 1) may be performed to convert an image into k-dimensional feature vectors so that objects with similarities (e.g., pixel intensity, RGB value, texture, etc.) can be grouped together. Image conversion 145 may be performed using one or more of the following techniques, alone or in combination: (1) pixel intensity clustering for multilevel image segmentation; (2) scale-invariant features transforms; (3) speeded-up robust features (SURF); and (4) histogram of oriented gradients. After the image has been converted into k-dimensional feature vectors, the feature vectors may be processed through a convolutional neural network (CNN).

Plant biomass modeling 150 (shown in deep-learning model 130 of FIG. 1) may be performed using one or more of the following techniques, alone or in combination: (1) random forest regression modeling; (2) multivariant linear regression (MLR); (3) multivariate adaptive regression splines (MARS); and (4) support vector regression (SVR).

Plant health modeling 155 (shown in deep-learning model 130 of FIG. 1) may be performed by determining chlorophyll fluorescence using normalized difference vegetation index of infrared and visible spectrum light. For example, this may be determined using the formula NDVI=(NIR−VIS)/(NIR+VIS), where NDVI refers to normalized difference vegetation index, NIR refers to near infrared, and VIS refers to visible red.

Recipe analysis 160 (shown in deep-learning model 130 of FIG. 1) may be performed to determine optimal value of input variables for desired outputs of various types of plants. Recipe analysis 160 may take into account user-defined parameters and/or a "spectral recipe."

Outputting a decision and confidence score 165 (shown in deep-learning model 130 of FIG. 1) may be performed by determining the results of each tasks, along with a confidence score indicating the artificial-intelligence engine's confidence in its results. For example, if the artificial-intelligence engine is performing leaf counting, the results may include a number of leaves and a confidence score in that number of leaves. As another example, if the artificial-intelligence engine is performing boundary estimation, the results may include the image with a boundary drawn on it and a confidence score indicating the accuracy of the drawn boundary.

FIG. 3 shows an exemplary training model for each instance of the processing tasks performed using the exemplary architecture of FIG. 2. The training model may include functionality for testing, training, and validating the artificial-intelligence decision model that can be used to make the artificial-intelligence decision model more accurate in its modeling of the plants in the system over time. As explained above, the artificial-intelligence engine may use input images as a source of information and provide results in terms of extraction. The extracted results may be used for identifying plants, detecting plant stress, detecting diseases of the plant, determining plant segmentation, and/or determining plant phenotype from the image data. As the artificial-intelligence engine performs tasks repeatedly over time, it may learn from its previous inputs and outputs such that it provides better results over time.

As shown in the example of FIG. 3, an image dataset or raw images 300 may be input into the artificial-intelligence model. The artificial-intelligence model may perform data annotation 305 on the raw image dataset to produce annotated images. The artificial-intelligence model may perform data augmentation 315 on the annotated images to produce annotated and augmented data 320. From there, the annotated and augmented data 320 may be used for testing, training, and/or validation.

As part of training and validation, the annotated and augmented data 320 may be used for deep learning. From there, training parameters are determined, which are used for training. Once training has been performed, manual verification is performed by a user so that the system can learn from whether it correctly identified the extracted information based on the raw image dataset. These steps may be performed to generate a model for each of plant identification 325, plant stress 330, disease detection 335, plant segmentation 340, and plant phenotyping 345. For example, to generate a model for plant identification 325, the annotated and augmented data 320 is provided to deep learning 325A to generate training parameters for the plant identification model 325. The generated training parameters are then used for training the plant identification model 325. The plant identification model 325 is then verified. The same process steps of generating a model using deep learning, performing training using training parameters, and verifying may be performed for a plant stress detection model 330, disease detection model 335, plant segmentation model 340, and plant phenotyping model 345.

The exemplary process shown in FIG. 3 may be applied over time to the artificial-intelligence engine such that the results of each processing step continue to improve over time, as the system runs and receives and analyzes more data.

Figure 4:
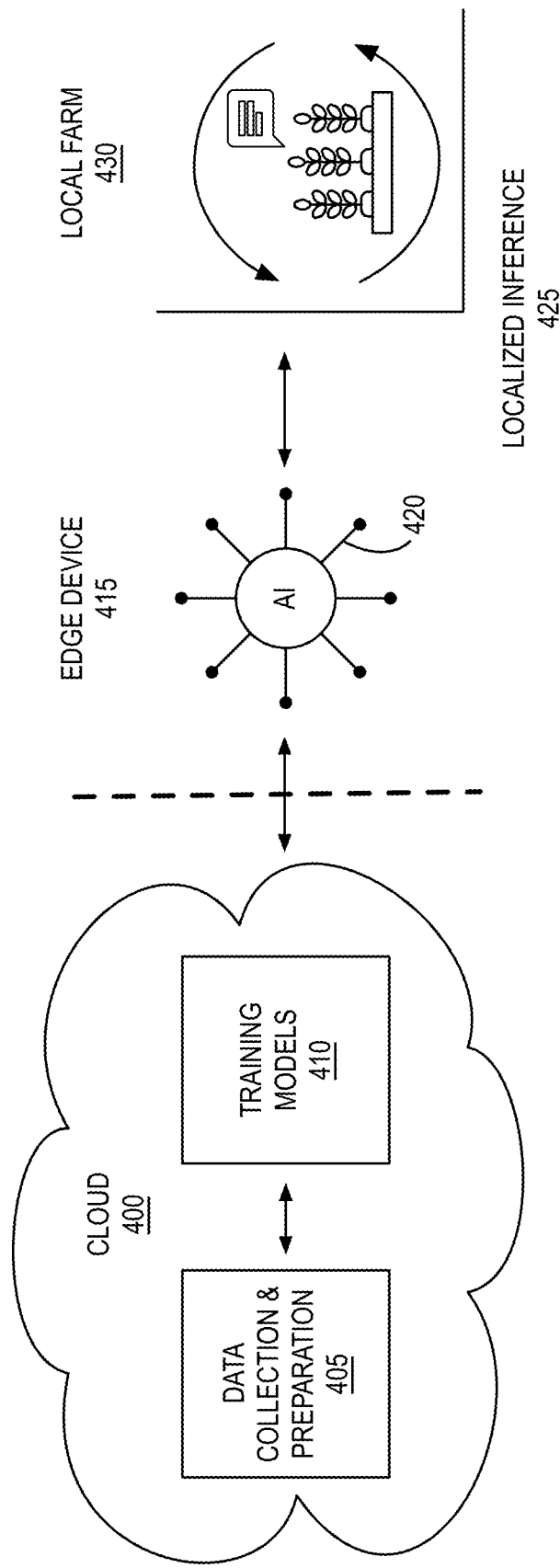
FIG. 4 shows an exemplary system architecture that uses an edge device for performing localized processing.

FIG. 4 shows an exemplary system architecture that uses an edge device for performing localized processing. As described above in the context of FIG. 1, in some embodiments, the autonomous plant-growth optimization system described herein may use edge-deployed AI for real-time or near real-time processing (as opposed to doing the real-time/near real-time processing in the cloud). As shown in FIG. 4, cloud server 400 performs data collection and preparation 405 as well as generating and/or training models 410 for machine-learning intelligence, as described in more detail above in the context of FIGS. 1-3. As explained above, the artificial-intelligence models may be first generated and then deployed to the cloud (e.g., cloud server 400) for training the models 410. As the models are trained, the trained models 410 are then deployed to edge devices 415, which performs the localized processing of the deployed artificial-intelligence decision models to make localized inferences 425 and provide feedback and control for local farm 430.

Figure 5:
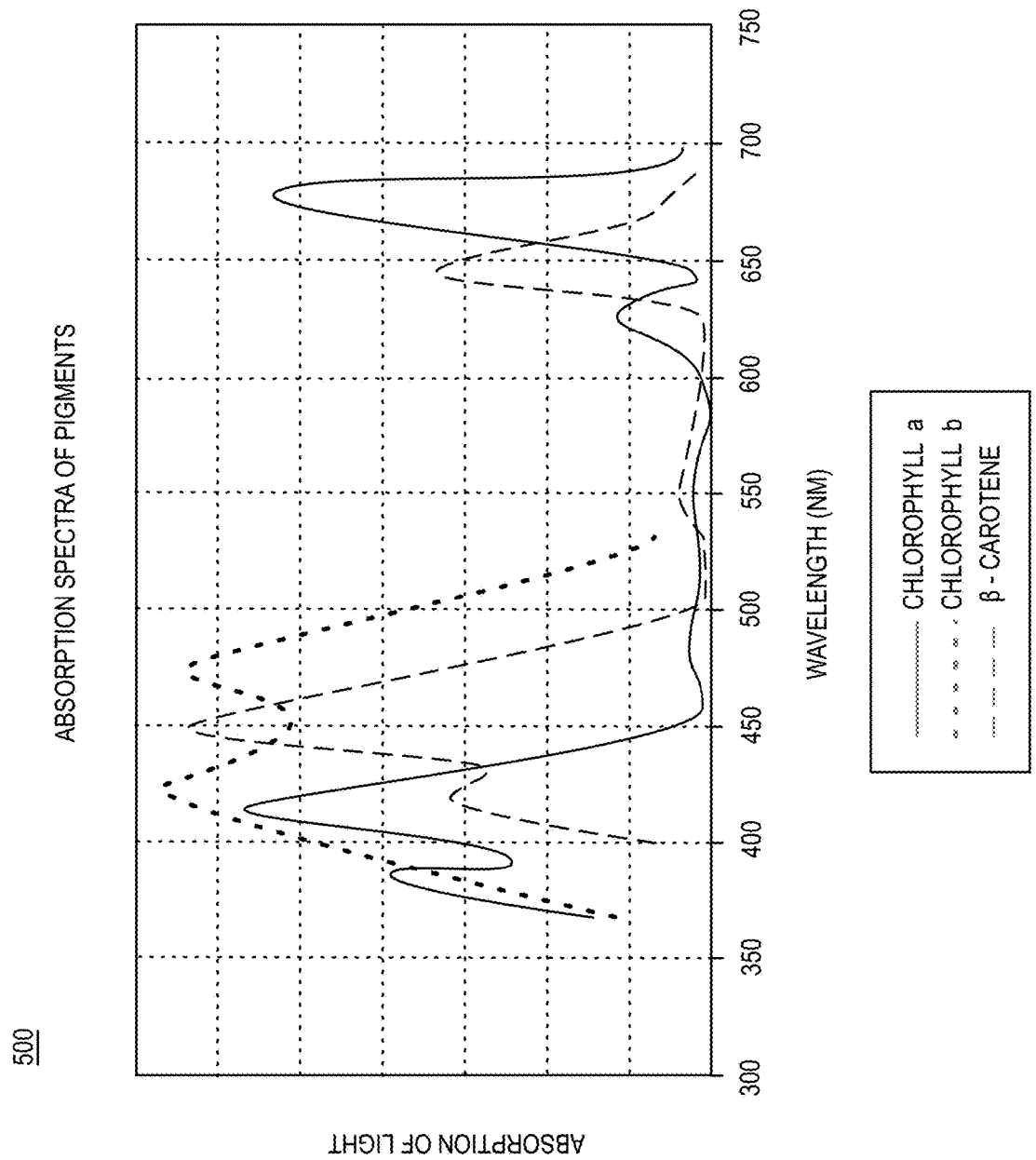
FIG. 5 shows a chart of absorption spectra of plant pigments. Different light spectrums have widely varying effects on plants.

FIG. 5 shows a chart of absorption spectra of plant pigments. Different light spectrums have widely varying effects on plants. Different pigments of plants have different absorption properties. Generally, maximum light absorption by plant pigments (e.g., chlorophyll and carotenoids) occurs mainly in the blue and red regions on the light spectrum. For example, as shown in FIG. 5, maximum light absorption for chlorophyll a occurs around 400 nm and 675 nm wavelengths. Maximum light absorption for chlorophyll b occurs around 400-450 nm wavelengths. Maximum light absorption for β-carotene occurs around 450 nm and 650 nm wavelengths.

Plants have a number of different photoreceptors. The photoreceptors enable plants to sense light having wavelengths in the 300-750 nm range. Plants use light with different wavelengths as an environmental cue to initiate important development transitions.

The photoreceptor cryptochrome is involved in perception of UVA light and blue light. Cryptochromes sense light in the 320-500 nm wavelength range and are responsible for photomorphogenesis and flowering.

The photoreceptor phototropin is involved in perception of UVA light and blue light to mediate phototropism and chloroplast movement. Phototropins sense light in the 320-500 nm wavelength range and are responsible for phototropism and leaf development.

The photoreceptor phytochrome is involved in reception of red light and far-red light. Phytochromes sense light in the 600-750 nm wavelength range and are responsible for germination, photomorphogenesis, shade avoidance, and transition to flowering.

As part of the machine-learning process used by the autonomous plant-growth optimization system described herein, the machine-learning model may be trained to understand the various ways in which plants respond to and/or use different types of light. By teaching the machine-learning model how plants user the different types of light, the model is then able to make valuable decisions relating to how the lights should be applied to plants to achieve desired harvest characteristics in real-time as the plants grow. This may be thought of as self-regulation of the growing environment discussed above.

The functionalities discussed above may be executed in a cloud server or an edge device, or any combination of the two. The cloud server functionality described herein may comprise more than one physical server, and those physical servers may be located remotely from one another. Similarly. The edge device functionality described herein may comprise more than one physical device. The physical devices may be a computer or a server or any other computing device with a processor and memory. The physical devices that make up the edge device may be located remotely from one another, although they will all be generally located near or proximate to the indoor farming facility they are serving.

The descriptions, figures, and examples provided above are illustrative and are not to be construed as limiting. Nor is the disclosure meant to be limited to the embodiments described in this specification. Specific details are described to provide a thorough understanding of the disclosure; however, in certain instances, well-known or conventional details have not been described to avoid obscuring the description. Modifications/variations will be apparent to those of ordinary skill in the art without departing from the scope and spirit of the described embodiments.

The terms used in this disclosure generally have their ordinary meanings in the art, within the context of the disclosure, and in the specific context where each term is used. The technical and scientific terms used in this disclosure have the same meaning as commonly understood by one of ordinary skill in the art to which this disclosure pertains. In the case of conflict, this document controls. Alternative language and synonyms may be used for the terms discussed herein, nor is any special significance to be placed upon whether or not a term is elaborated or discussed herein. Use of a synonym does not exclude the use of other synonyms.

The singular forms "a," "an," and "the" are intended to include the plural forms as well, unless the context clearly indicates otherwise. The terms "comprises" and "comprising" specify the presence of the thing (e.g., function, element, step, etc.) stated but do not preclude the presence of additional things.

The functionalities discussed in this disclosure may be executed by a computer system or other type of machine that stores and executes a set of instructions perform the functionalities. The machine may operate as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, a smartphone, an iPhone, an iPad, an Android-based device, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

The methods disclosed herein may be implemented on purpose-built devices such as a custom-built device with assembled hardware or the like. Additionally, the methods and systems disclosed herein may be implemented on existing RF communications devices that utilize communication modules embodying Wi-Fi®, Bluetooth®, Bluetooth® Low Energy, cellular long-term evolution (LTE®), or many other communications systems and devices.

Aspects of the present invention may be implemented as a system, method or computer program product. They may be implemented as an entirely hardware embodiment, an entirely software embodiment (including firmware, resident software, micro-code, etc.) or an embodiment combining software and hardware aspects that may all generally be referred to herein as a "circuit," "module" or "system." Aspects of the present invention may be implemented as a computer program product embodied in one or more computer-readable medium(s) storing computer-readable program code. The terms "machine-readable medium" and "machine-readable storage medium" may include a single medium or multiple media (e.g., a centralized or distributed database, and/or associated caches and servers) that store one or more sets of instructions. These terms may include any medium that is capable of storing, encoding or carrying a set of instructions for execution by the machine and that cause the machine to perform any one or more of the methodologies of the presently disclosed technique and innovation.

Any combination of one or more computer-readable medium(s) may be utilized. The computer-readable medium may be a computer-readable signal medium or a computer-readable storage medium (such as non-transitory computer-readable storage media). A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Kotlin®, OCaml®, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed.

What is claimed is:

1. A method of optimizing growth of one or more plants in an indoor farm using light, comprising:
   generating a decision-making model using machine-learning hosted at a data warehouse to characterize the one or more plants using image processing,
      wherein the data warehouse is communicatively coupled to one or more image sensors located at the indoor farm,
      wherein the data warehouse is communicatively coupled to one or more environmental sensors located at the indoor farm, and
      wherein the data warehouse is communicatively coupled to one or more light fixtures located at the indoor farm;
   generating image data of the one or more plants using the one or more image sensors, wherein the image data represents the one or more plants;
   measuring environmental data associated with the one or more plants using one or more environmental sensors;
   transmitting the generated image data and the measured environmental data to the data warehouse;
   analyzing, at the data warehouse, the generated image data of the one or more plants to characterize the one or more plants;
   applying, at the data warehouse, the generated decision-making model based on the characterization of the one or more plants, the measured environmental data, and a spectral recipe;
   generating, at the data warehouse, a lighting control signal based on the application of the decision-making model; and
   adjusting the output of the one or more light fixtures in response to the generated lighting control signal.

2. The method of claim 1, wherein characterizing the one or more plants includes determining at least one of a growth phase, a phenotype, and a photochemical efficiency for each of one or more of the plants.

3. The method of claim 1, wherein characterizing the one or more plants includes performing one or more of plant detection and localization, plant segmentation, leaf detection and localization, leaf counting, leaf segmentation, leaf tracking, boundary estimation for multi-instance segmentation, and growth phase and maturity prediction.

4. The method of claim 1, wherein the image sensors include one or more of an RGB imaging sensor, an IR imaging sensor, a multi-spectral imaging sensor, and a fluorescence imaging sensor.

5. The method of claim 1, wherein the environmental sensors include one or more of a $CO_2$ sensor, moisture sensor, humidity sensor, temperature sensor, pH sensor, EC sensor, energy usage sensor, and PPFD sensor.

6. The method of claim 1, wherein adjusting the output of one or more light fixtures includes adjusting light intensity, spectral output, and photoperiod.

7. The method of claim 1, wherein the generated lighting control signal is determined such that it will adjust the output of the one or more light fixtures to emit an optimum light intensity based on a determined growth phase, a determined photochemical efficiency, and a desired harvest trait of the one or more plants.

8. A method of optimizing growth of one or more plants in an indoor farm using light, comprising:
generating a decision-making model using machine-learning hosted at a data warehouse to characterize the one or more plants using image processing;
transmitting the generated decision-making model to an edge device,
wherein the edge device is located at the indoor farm,
wherein the edge device is communicatively coupled to the data warehouse,
wherein the edge device is communicatively coupled to one or more image sensors located at the indoor farm,
wherein the edge device is communicatively coupled to one or more environmental sensors located at the indoor farm, and
wherein the edge device is communicatively coupled to one or more light fixtures located at the indoor farm;
generating image data of the one or more plants using the one or more image sensors, wherein the image data represents the one or more plants;
measuring environmental data associated with the one or more plants using one or more environmental sensors;
transmitting the generated image data and the measured environmental data to the edge device;
analyzing, at the edge device, the generated image data of the one or more plants to characterize the one or more plants;
applying, at the edge device, the generated decision-making model based on the characterization of the one or more plants, the measured environmental data, and a spectral recipe;
generating, at the edge device, a lighting control signal based on the application of the decision-making model; and
adjusting the output of the one or more light fixtures in response to the generated lighting control signal.

9. The method of claim 8, wherein characterizing the one or more plants includes determining at least one of a growth phase, a phenotype, and a photochemical efficiency for each of one or more of the plants.

10. The method of claim 8, wherein characterizing the one or more plants includes performing one or more of plant detection and localization, plant segmentation, leaf detection and localization, leaf counting, leaf segmentation, leaf tracking, boundary estimation for multi-instance segmentation, and growth phase and maturity prediction.

11. The method of claim 8, wherein the image sensors include one or more of an RGB imaging sensor, an IR imaging sensor, a multi-spectral imaging sensor, and a fluorescence imaging sensor.

12. The method of claim 8, wherein the environmental sensors include one or more of a $CO_2$ sensor, moisture sensor, humidity sensor, temperature sensor, pH sensor, EC sensor, energy usage sensor, and PPFD sensor.

13. The method of claim 8, wherein adjusting the output of one or more light fixtures includes adjusting light intensity, spectral output, and photoperiod.

14. The method of claim 8, wherein the generated lighting control signal is determined such that it will adjust the output of the one or more light fixtures to emit an optimum light intensity based on a determined growth phase, a determined photochemical efficiency, and a desired harvest trait of the one or more plants.

15. The method of claim 8, wherein the edge device is a personal computer.

16. A system for optimizing growth of one or more plants in an indoor farm using light, comprising:
one or more image sensors for generating image data of the one or more plants,
wherein the image sensors include wireless connectivity for transmitting the gathered image data to be processed;
one or more environmental sensors for measuring environmental data associated with the one or more plants,
wherein the environmental sensors include wireless connectivity for transmitting the gathered environmental data to be processed;
a data warehouse configured to generate a decision-making model using machine-learning hosted at the data warehouse,
wherein the decision-making model characterizes the one or more plants using image processing;
an edge device configured to:
receive the generated decision-making model from the data warehouse;
receive the generated image data from the image sensors;
receive the measured environmental data from the environmental sensors;
analyze the generated image data to characterize the one or more plants;
apply the generated decision-making model based on the characterization of the one or more plants, the measured environmental data, and a spectral recipe;
generate a lighting control signal based on the application of the decision-making model;
one or more light fixtures that emit light of varying spectrum and intensity to one or more of the plants, wherein the spectrum and intensity of the emitted light is adjusted in response to the lighting control signal generated by the edge device; and
a user interface for accessing information relating to the one or more plants.

17. The system of claim 16, wherein the machine-learning model characterizes the one or more plants by determining at least one of a growth phase, a phenotype, and a photochemical efficiency for each of one or more of the plants based on the gathered image data.

18. The system of claim 16, wherein the machine-learning model characterizes the one or more plants by performing one or more of plant detection and localization, plant segmentation, leaf detection and localization, leaf counting, leaf segmentation, leaf tracking, boundary estimation for multi-instance segmentation, and growth phase and maturity prediction based on the gathered image data.

19. The system of claim 16, wherein the environmental sensors include one or more of a $CO_2$ sensor, moisture sensor, humidity sensor, temperature sensor, pH sensor, EC sensor, energy usage sensor, and PPFD sensor.

20. The system of claim 16, wherein applying light of varying spectrum and intensity to one or more of the plants based on the characterization of one or more of the plants includes determining an optimum light intensity based on a plant's determined growth phase and photochemical efficiency.

* * * * *